Nov. 9, 1937.   P. N. CHIASSON   2,098,859
COMBINED FELLY, RIM, AND DUAL PNEUMATIC TIRE STRUCTURE
Filed Feb. 8, 1937   3 Sheets-Sheet 3
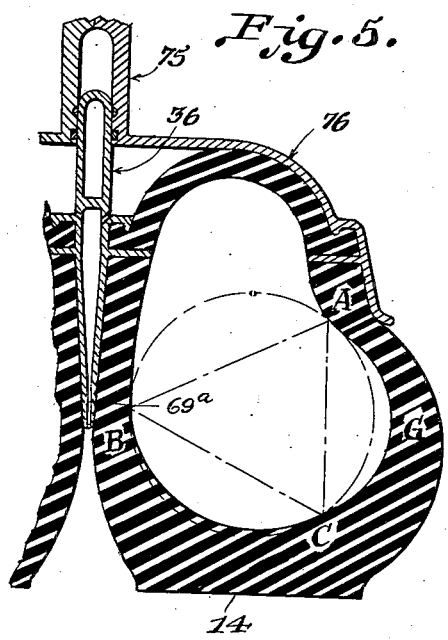
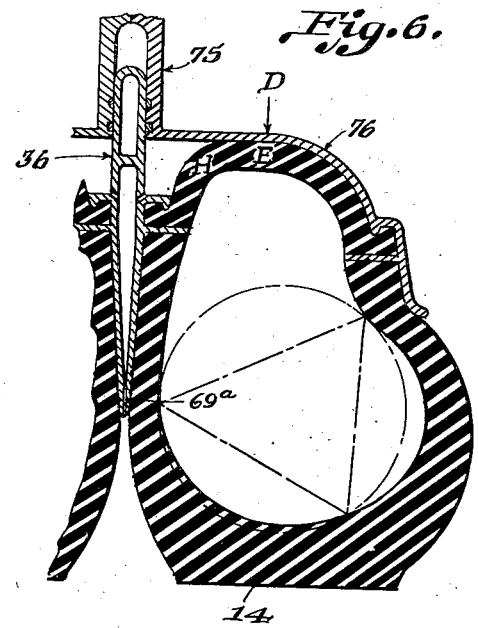
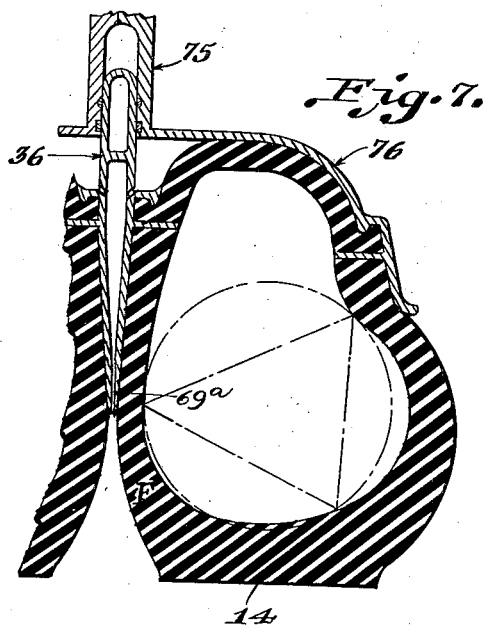
Inventor
Placid N. Chiasson
By Kimmel & Crowell
Attorneys Patented Nov. 9, 1937

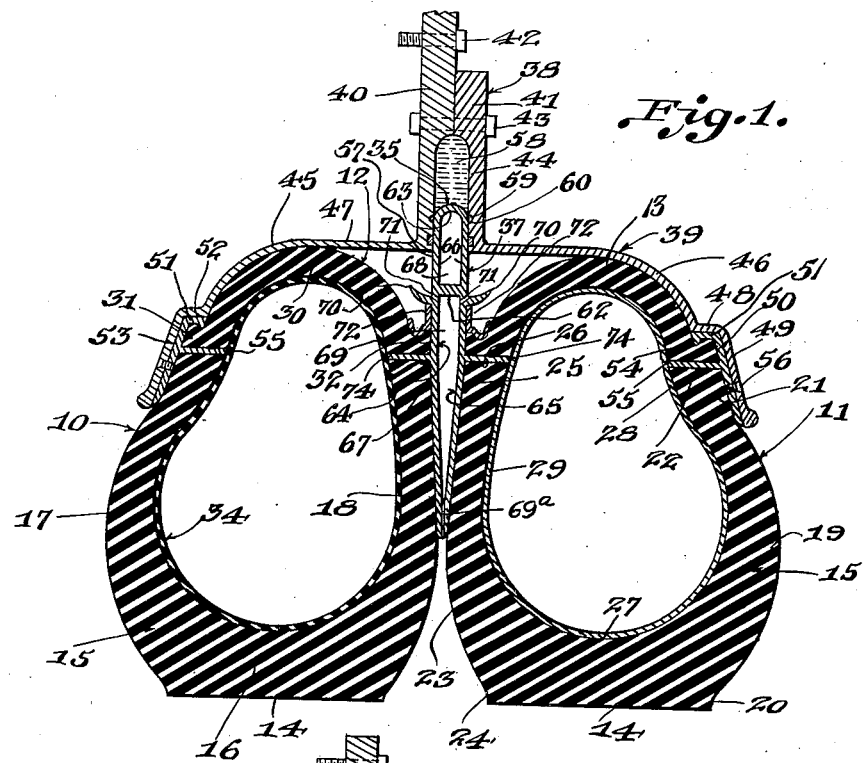

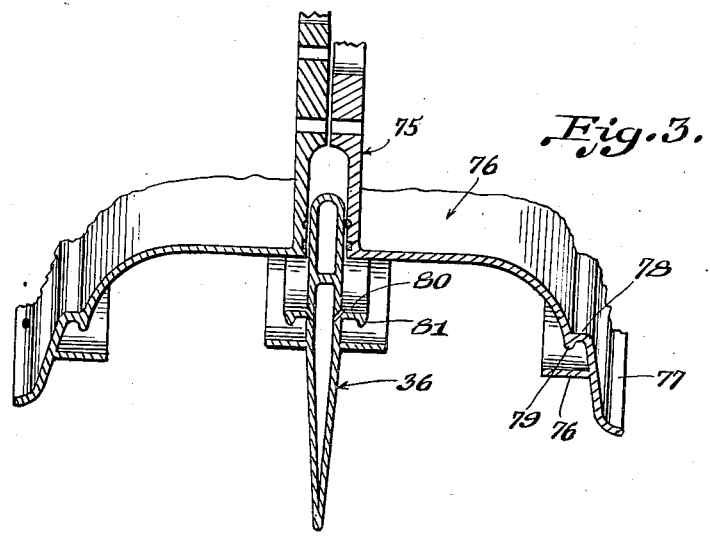
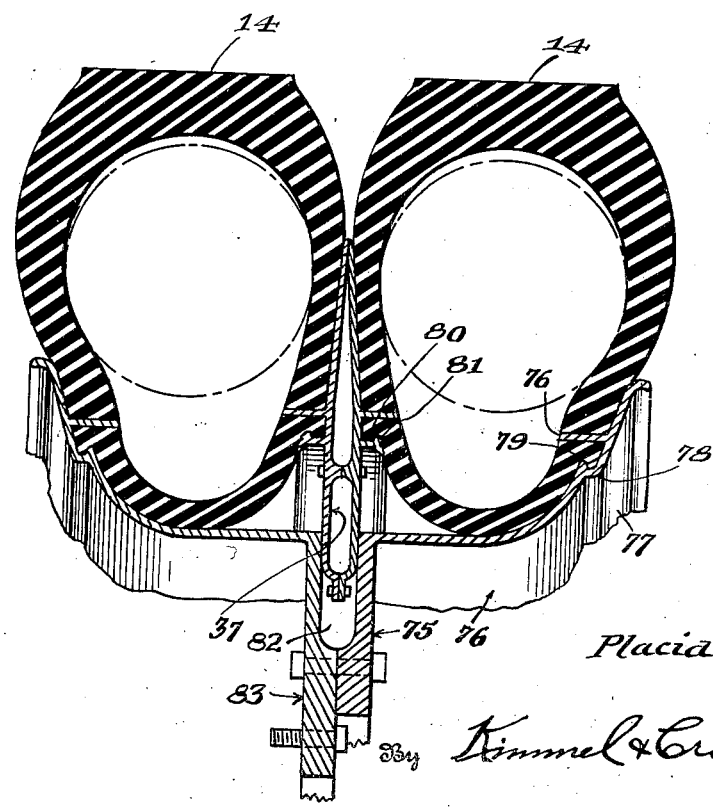

2,098,859

UNITED STATES PATENT OFFICE 2,098,859

COMBINED FELLY, RIM, AND DUAL PNEUMATIC TIRE STRUCTURE

Placid N. Chiasson, Griggsville, Ill.

Application February 8, 1937, Serial No. 124,770

12 Claims. (Cl. 152—13)

This invention relates to a combined felly, rim and dual pneumatic tire structure designed primarily for use in connection with the wheels of automotive vehicles, but it is to be understood that a structure, in accordance with this invention, is to be used in any connection for which it may be found applicable, and the object of the invention is to provide, in a manner as hereinafter set forth, a structure of the class referred to including a pair of sidewise opposed pneumatic tire elements arranged in a manner relative to each other to make the structure readily adaptable for the front and rear wheels of the vehicle and to afford greater safety and comfort in motor vehicle transportation, as well as greater traction.

A further object of the invention is to provide, in a manner as hereinafter set forth, a structure of the class referred to including a pair of independent pneumatic tire elements for traction purposes and with said elements connected with a felly common thereto. The said elements are so arranged relative to each other to provide, if one becomes impaired while the vehicle is in motion, for the other to perform its traction function thereby reducing accidents to a minimum and with the non-impaired element being the equivalent of a spare tire.

A further object of the invention is to provide, in a manner as hereinafter set forth, a structure of the class referred to including a pair of independent sidewise opposed pneumatic tire elements for a wheel acting to reduce skidding at sharp corners and on slippery pavements, and whereby when each of the front and each of the rear wheels of the vehicle is equipped with a combination structure, in accordance with this invention, eight pneumatic tire elements will support the vehicle instead of the usual four, resulting in a reduction of air pressure and, therefore, less danger of blowouts.

A further object of the invention is to provide, in a manner as hereinafter set forth, a structure of the class referred to including a pair of sidewise opposed, closed tire elements separated by a floating abutment element common thereto and with each tire element including a sectional outer shoe and an inflatable inner tube encompassed by the sections of the shoe.

Further objects of the invention are to provide, in a manner as hereinafter set forth, a structure of the class referred to which is simple in its construction and arrangement, strong, durable, compact, thoroughly efficient in its use and comparatively inexpensive to manufacture.

To the above ends essentially and to others which may hereinafter appear, the invention consists of the novel construction, combination and arrangement of parts as will be more specifically described and as are illustrated in the accompanying drawings wherein is shown an embodiment of the invention, but it is to be understood that changes, variations and modifications may be resorted to which fall within the scope of the invention as claimed.

In the drawings:

Figure 1 is a cross sectional view of the combined felly, rim and dual pneumatic tire structure, in normal position, Figure 2 is a view similar to Figure 1 of a modified form with the inner tube not shown and provided with stress indicating indicia, Figure 3 is a fragmentary view in perspective of the combined felly, rim and slidable combined confining, separating and abutment element of the forms shown in Figures 1 and 2, Figure 4 is a cross sectional view of still another modified form of the structure illustrating that portion thereof, remote from the roadway and with no pressure applied thereon, and Figures 5, 6 and 7 are fragmentary views in cross section of the form shown in Figure 2 provided with the stress indicating indicia and showing the positions of the outer shoe under varying stress conditions. In these figures the inner tube is not shown.

With reference to the drawings both forms include a pair of oppositely disposed annular outer shoes of like form and a pair of annular cap members of like form. The shoes are indicated at 10, 11 and the caps at 12, 13. Each shoe in cross section has a squared head edge 14. Each shoe is open at its inner side. The body of each shoe is indicated at 15 and includes an outer or tread part 16, an outer side part 17 and an inner side part 18. The parts 17, 18 at their outer ends merge into the part 16. Each shoe in cross section has its outer side edge formed with an intermediate edge portion 19 of convex contour, an outer inwardly inclined edge portion 20 merging at one end into one end of the edge 14 and an inner outwardly inclined edge portion 21 which merges at one end into the outer side of the inner edge 22 of side part 17. The inner end of edge portion 19 merges into the outer end of edge portion 21. The outer end of edge portion 19 merges into the inner end of edge portion 20. The inner edge 22 of part 17 in cross section is squared. Each shoe in cross section has its inner side edge formed with an intermediate edge portion 23 of convex contour, an outer inwardly inclined edge portion 24 merging at one end into the other end of the edge 14 and an inner outwardly inclined edge portion 25 which merges at one end into the outer side of the inner edge 26 of the side part 18. The inner end of edge portion 23 merges into the outer end of edge portion 25. The outer end of edge portion 23 merges into the inner end of edge portion 24. The edge portions 20, 24 are of the same length. The edge portion 19 is of materially greater length than edge portion 23. The edge portion 25 is of materially greater length than edge portion 20. The edge 22 in cross section is of greater length than the edge 26 in cross section. The side part 17 throughout is greater in thickness than the side part 18 throughout. Each shoe in cross section has segmental inner edge portion 27 of greater length than a half circle, a curved inner edge portion 28 of less length than and which is oppositely curved with respect to edge portion 27 and an edge portion 29 merging at its outer end into one end of edge portion 27 and at its inner end into the outer side of edge 26 of the side part 18. The outer end of edge portion 28 merges into the other end of edge portion 27 and at its inner end merges into the inner side of the edge 22 of the side part 17. The edge portion 29 is of greater length than edge portion 28 and inclines inwardly throughout from its point of mergence with edge portion 27. The inclination of edge portion 29 is greater than that of edge portion 25. The side part 17 gradually decreases in thickness from tread part 16 for the major portion of its length, in cross section and has its remaining part gradually increasing in thickness to its edge 22. The side part 18 gradually decreases in thickness for the major portion of its length from its edge 26 and has its remaining portion gradually increasing in thickness to tread part 16.

Each cap member is formed of an arcuate body portion 30 provided at each end with a lateral flange. The flanges are oppositely disposed and are indicated at 31, 32 and are formed with reduced inner portions to provide grooves 33. The inner faces of the cap members form spaced continuations of the inner faces of the shoes. The cap members provide closures for the open inner ends of the shoes. Common to a shoe and its associated cap member is an inflatable inner-tube 34.

Each of the forms shown includes an annular slidable combined confining, separating and abutment element. In Figures 1, 2 and 4 the said elements are indicated at 35, 36 and 37 respectively and are of the floating type. Each of said elements is formed with an inner portion of uniform width in cross section and an outer portion which tapers throughout from said inner portion. The outer portion has its cross sectional length greater than that of the inner portion. The construction of the elements 35, 36 and 37 will be more specifically described hereinafter.

With reference to Figure 1 the structure includes a felly and a rim which are indicated generally at 38, 39 respectively. The felly 38 is formed of a pair of annular sections 40, 41. The body of section 40 in vertical section is of greater length than that of section 41 in vertical section. The section 40 extends inwardly from section 41 and is to be connected with the spokes, not shown, web, not shown or hub not shown, by spaced holdfast devices and each will be of the form as indicated at 42. The sections 40, 41 are secured together by spaced holdfast devices and each will be of the form as indicated at 43. The outer portions of the sections 40, 41 have their opposed inner faces dished out to form an outwardly opening endless pocket 44.

The rim 39 is formed of a pair of annular oppositely disposed spaced inner edgewise aligned sections 45, 46 of like form which are integral with the felly sections 40, 41 respectively at the outer ends of the felly. Each rim section consists of an inner annular part 47 integral at its inner end with a felly section. The outer portion of the part 47 curves outwardly and merges into an intermediate annular part 48 disposed in outwardly directed angular relation with respect to part 47. The part 47 merges at its outer side into the inner end of an outwardly directed flared annular flange 49. The curved portion of the part 47 forms a seat for a part of a cap member. The part 48 and the flange 49 provides respectively a holder and an abutment for a supporting and confining ring 50. The latter consists of an annular body part 51 of angle shaped cross section formed with an inner and an outer leg 52, 53 respectively. The leg 52 is of less length in cross section than that of the leg 53 in cross section. The leg 52 is integral with and extends inwardly from the inner end of leg 53. The leg 52 at its inner end is provided with a forwardly directed projection 54 for a purpose to be referred to. Formed integral with and extending inwardly from the inner face of leg 53 is a band 55 which is disposed in concentric spaced relation to the leg 52. The ring provides a combined seat, separator and abutment for and is common to one end of a side of a shoe and one end of a side of the cap which is associated with the shoe. The leg 52 of ring 50 abuts the outer face of part 48 of a rim section. The leg 53 abuts the inner face of flange 49 of a rim section. The leg 53 and flange 49 are detachably connected together by spaced countersunk holdfast means 56, only one shown. When the structure is set up the edge 22 of the side 17 of a shoe abuts the outer face of band 55, the edge portion 21 of side 17 abuts that portion of the inner face of leg 53 extended outwardly from band 55, the end edge of the outer side of a cap member and the outer flange of the latter abut the inner face of ring 55, the said outer flange abuts the inner portion of the inner face of leg 53, the said outer flange abuts the outer face of leg 52 and the projection on leg 52 extends into groove 33 formed in the inner face of the outer flange. The felly, rim sections and rings 50 are termed a carrying means.

The element 35 is interposed between and bears against the outer faces of the inner sides of the shoes, bears against the edges 26 of the inner side parts of the shoes, bears against the end edges of the inner sides of the cap members, and bears against the outer faces of the inner flanges of the cap members. The element 35 includes a hollow annular body part 57 which has its inner portion slidably mounted in pocket 44. A body of lubricant 58 is arranged in pocket 44. The opposite walls of pocket 44 are formed with oil grooves 59 in which are arranged packing rings 60. The body part 57 provides a chamber in which is arranged an endless partition 62. The body part 57 includes a rounded inner part 63 and a pair of oppositely disposed side parts 64, 65 of like form. The side parts in vertical section are formed with straight spaced parallel inner portions 66 and inwardly extending inclined outer portions 67 which at their outer ends merge into each other or are connected together by any suitable means. The inner portions of the side parts 64, 65 merge into the ends of the inner part 63. The chamber is endless and divided into an inner and an outer compartment 68, 69 by the partition 62. Compartment 69 has an outlet 69a. Integral with the outer faces of the portions 66 outwardly adjacent and in proximity to the partition 62 is a pair of oppositely disposed curved combined lubricant collecting and deflecting elements 70 of like form. The portions 66, at the inner ends of the elements 70 are ported as at 71 for the discharge of the collected lubricant into the compartment 69. The elements 70 also provide abutments for a pair of oppositely disposed locking or clamping rings 72 of angle-shaped contour in cross sections. Formed integral with the side parts, 64, 65 at the point of mergence of the portions 66 with the portions 67 and disposed at right angles thereto are bands 74.

When the element 35 and rings 72 are arranged relative to the shoes and cap members the edge portions of the inner side parts 18 of the shoes abut the inclined portions 67 of the sides of body part 57, the edges 26 of the side parts 18 of the shoes abut the outer faces of the bands 74, the end edges of the inner sides of the cap members and the forward faces of the inner flanges 32 seat against the inner faces of the bands 74, the outer ends of the flanges 32 abut the portions 64 of the sides of body part 57 and the rings 72 are interposed between elements 70, abut flanges 32, extend into the grooves of flanges 32, abut the portions 67 of the sides of body part 57 and bear against the outer faces of the inner sides of the cap members, these latter being removable.

In the construction shown in Figures 2 and 3, the rings 50 and 72 are not employed. The felly 75 and rim 76 in Figure 2 are of the same construction as that shown in Figure 1 with this exception that the flange 77 (which corresponds to rim flange 49 of rim 39), of a rim section of rim 76 is provided on its inner face with a band 78 for the same purpose as the band 55 and that the part 78 (which corresponds to part 48 of rim 39) is formed with an outwardly directed extension 79. The part 78 and extension 79 are for the same purpose as leg 52 and extension 54. The element 36 employed in Figures 2 and 3 is substantially the same as the element 35 of Figure 1, with this exception that it is not provided with the curved elements 70, but in lieu thereof a pair of oppositely extending bands 80 having outwardly directed extensions 81. The bands 80 combine the functions of the elements 70 and rings 72. Otherwise than that as stated the construction of the rim 75 and element 36 will be the same as that of rim 39 and element 35.

The construction shown in Figure 4 is the same as that set forth by Figures 2 and 3 with the exception that the element 37 which corresponds to element 36 is formed of a pair of oppositely disposed sections of like form anchored together. The width of the pocket 82 in the felly 83 will be such as not to require the use of a lubricant for element 37. The latter is not ported. The drawings represent the top of the tire, or rather the opposite of that part of the tire which is in contact with the pavement. The edges of the median walls, which are the inner side parts of the shoes have been forced outward and beyond the edges of the outer walls. The vertical diameters have been lengthened and the horizontal diameters shortened.

The cap members shown in Figures 2 to 7 are not removable.

That part of the shoe which extends from an element 35, 36 or 37 in cross section has an internal contour of approximately two thirds of a circle.

Each felly and rim section of each of the forms shown in Figures 2, 3 and 4 are termed carrying means.

The description of the cushion action will be set forth with respect to Figures 2, 5, 6 and 7, but it is to be understood that it also applies to Figures 1 and 4.

As the wheel turns or rolls and the weight of the vehicle is applied to that part of the tire which is in contact with the ground, the diameters between A and C and A and B will be shortened causing a bulging at G and flattening of the circle and which constitutes the first cushion action. D will come down against E causing a bulging at H and a flattening of E constituting the second cushion action. It will also shorten the diameter between the cap member and the tire tread producing pressure and a bulging at F which constitutes the third cushion action. These actions take place substantially simultaneously.

Rocking action: The rocking is due to A being forced downward toward C when weight is applied and returning to normal position when relieved. Counteraction: Forcing A toward C shortens the diameter between those two points and flattens the circle horizontally. It also brings D nearer to B, causing a flattening of E and a bulging at H thereby shortening the vertical diameter. B being brought nearer to D will also bring it nearer to A which will tend to restore the contour of the circle to its normal shape. The primary trend is to flatten the circle and the secondary trend is to restore its contour.

Contact of the tire tread: There will be less tendency for the tread to flatten against the pavement because of the straight median walls which have not so much direct weight applied to them as the outer walls.

When the tires are properly inflated and the vehicle in motion over smooth pavement, there will be very little bulging at F, and without bulging at F the contour of the tread will not be greatly affected. Bulging at F will only occur when extra pressure is produced at that point, like striking an object, or an unevenness in the road.

The tires will not be pushed apart by the weight of the vehicle because the median walls of the tires are brought nearer the felly while the outer walls are bulging outwardly. The tendency will be to press the tires together instead of pushing them apart at the traction point, but will slightly separate them at the top or that part which is opposite the part in contact with the pavement.

Figure 7 shows the tires as they would appear after the weight has been applied demonstrating the bulging at F, G and H.

What I claim is:

1. In a combined felly rim and dual tire structure, a pair of inner sidewise aligned pneumatic tires including outer shoes and cap members for closing the shoes, carrying means for the tires, and a floating slidable, annular, combined confining, separating and abutment element for and interposed between said tires.

2. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, said members and shoes having aligned edges, and said means and element having laterally extended parts positioned between and bearing against said aligned edges.

3. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, and said carrying means provided centrally thereof with a pocket into which said element slidably extends.

4. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, said carrying means including a pair of inwardly arranged oppositely extending spaced bands, said element being formed with a pair of oppositely extending bands, said cap members bearing against the inner faces of said bands, and said shoes bearing against the outer faces of said bands.

5. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, each of said shoes in cross section having the inner face of its outer portion of a contour greater than a half circle, and each of said shoes having its tread surface square in cross section.

6. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, and each of said cap members in cross section being of arcuate contour.

7. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, each of said members being of arcuate contour in cross section and bearing against said means and element, and each of said shoes bearing against said means and element.

8. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, and said element including an outer and an inner portion, said outer portion being tapered throughout from said inner portion.

9. In a combined felly, rim and dual tire structure, a pair of inner sidewise aligned pneumatic tires including outer shoes and cap members for closing the shoes, carrying means for the tires, a floating slidable, annular, combined confining, separating and abutment element for and interposed between said tires, said carrying means provided centrally thereof with a pocket into which said element slidably extends, said element including an inner and an outer portion, said inner portion extending into said pocket, said outer portion being tapered throughout from inner portion, and said outer portion having its cross sectional length greater than that of said inner portion.

10. In a structure of the class referred to a felly, a rim integral with the latter, a pair of spaced cap members within the rim, a pair of inner sidewise aligned pneumatic tires including outer shoes extending into the rim and closed by said cap members, a floating. slidable annular combined confining, separating and abutment element interposed between said tires and extended through the rim into the felly, and bands carried by the rim and said element, said bands being interposed between said members and shoes.

11. The invention as set forth in claim 10 having said felly formed of a pair of sections anchored together, and having said rim formed of a pair of oppositely disposed spaced sections integral with the sections of the felly.

12. The invention as set forth in claim 10 having said felly formed of a pair of spaced aligned oppositely disposed sections, said rim formed of a pair of sections anchored together and each integral with a rim section, said cap members bearing against rim sections and said element, and said shoes bearing against said element and rim sections outwardly adjacent of said bands.

PLACID N. CHIASSON.